Inventor
William P. Jacobson
By McCanna, Morsbach, Pillote & Muir
Attys

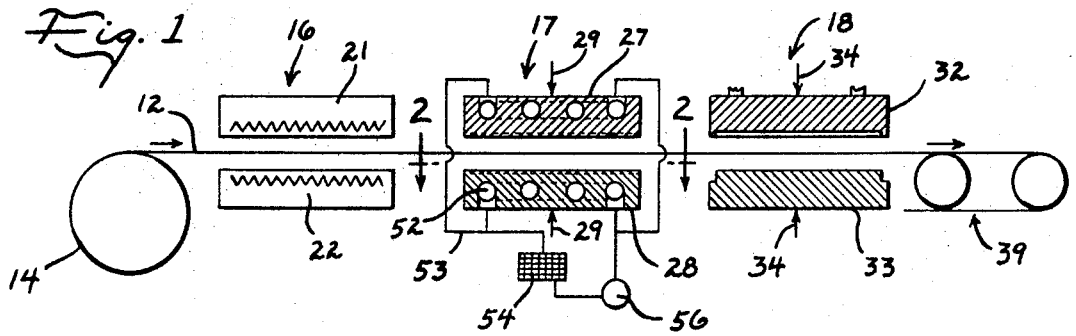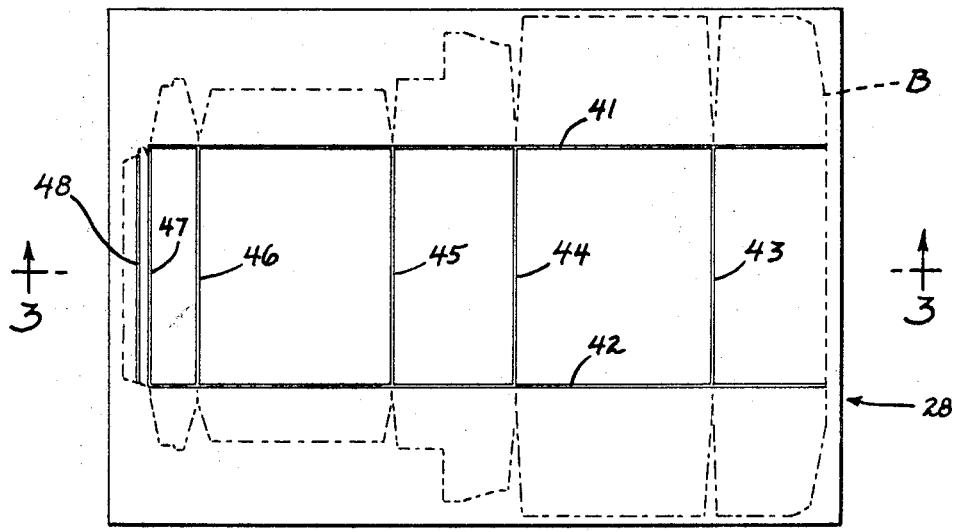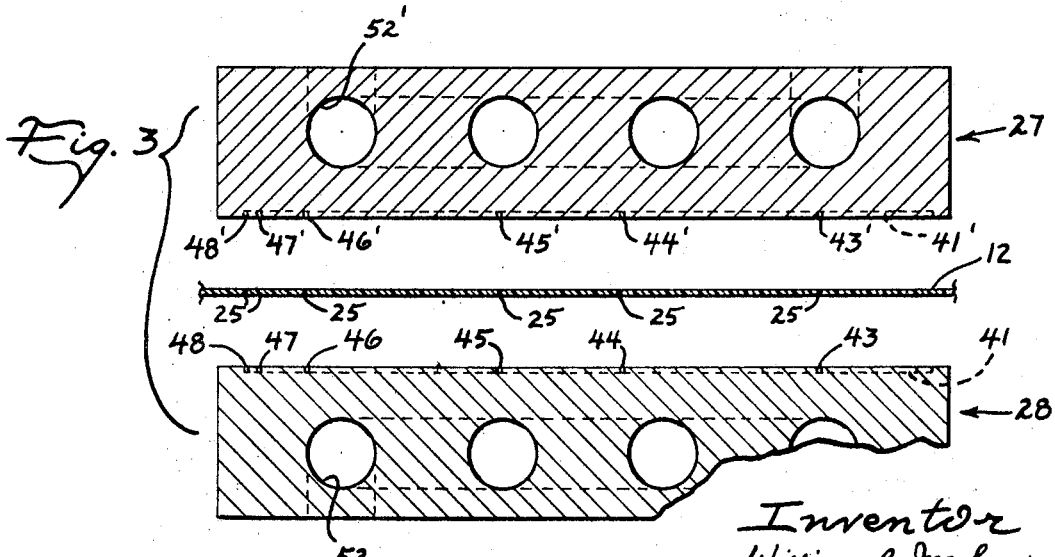

United States Patent Office 3,577,484
Patented May 4, 1971

3,577,484
METHOD FOR FORMING LINES OF WEAKNESS IN THERMOPLASTIC
William P. Jacobson, Rockford, Ill., assignor to Anderson Bros. Mfg. Co., Rockford, Ill.
Filed Feb. 27, 1969, Ser. No. 802,781
Int. Cl. B29c 25/00; B29d 7/22
U.S. Cl. 264—92
9 Claims

ABSTRACT OF THE DISCLOSURE

A line of weakness is formed in a sheet of thermoplastic which has been heated to render it soft and flowable by the disclosed method of cooling the surface of the heated sheet but not at the desired line of weakness and shrinking the sheet away from said line to reduce the thickness thereat. The line of weakness may be a fold line or a tear line, both of which are utilized in the disclosed carton. A carton blank is formed by apparatus which includes opposed heating heads, opposed forming heads and a trimming station. The forming heads have grooves in their surfaces at the desired location of the lines of weakness. Mechanisms are provided for cooling the forming heads and for drawing a vacuum on the grooves.

BACKGROUND

The invention pertains to plastics and more particularly to forming lines of weakness in thermoplastic.

In the past, fold lines and other lines of weakness have been formed in plastic by molding or thermoforming against a mold having a configuration complementary to the desired shape. Lines formed in this manner are quite wide. Narrow lines of weakness have been previously provided by scoring, as with a cutter. Such score lines may be used as fold lines or break lines. The latter procedure, however, necessitates additional mechanism and the maintenance of tolerances. When the cutter dulls, it must be replaced.

SUMMARY

The present invention relates to a method for forming lines of weakness in a sheet of thermoplastic.

The method is realized by heating a sheet of thermoplastic to render it soft and flowable, and cooling the surface of the heated sheet in preselected areas but not at the desired line of weakness and shrinking the sheet away from said line to reduce the thickness thereat.

It is a main object of the present invention to provide a simplified method for forming lines of weakness in a sheet of thermoplastic.

Another object is to provide a method in accordance with the foregoing object in which the lines of weakness can be accurately located and which can be utilized to form rather complex patterns of the lines.

These, and other objects and advantages of the present invention, will become apparent as the same becomes better understood from the following detailed description when taken in conjunction with the accompanying drawings.

DRAWING

FIG. 1 is a diagrammatic view of an apparatus capable of performing the steps of the method;

FIG. 2 is a large-scale top view of the lower forming head as seen from line 2—2 of FIG. 1 and showing the outline of the carton blank in phantom lines;

FIG. 3 is a cross-sectional view through the forming heads and sheet of thermoplastic and taken generally along line 3—3 of FIG. 2;

DESCRIPTION

Figure 4:
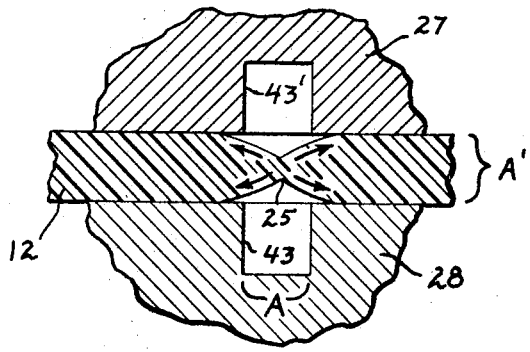
FIG. 4 is a partial sectional view of the forming heads and sheet of thermoplastic of FIG. 3 on a greatly exaggerated scale, and illustrating the forming of the line of weakness in accordance with the present invention.

As used herein, the term "line of weakness" is meant to described a reduction in thickness of the thermoplastic along a preselected line which is not necessarily a straight line. Lines of weakness in thermoplastic may be utilized as fold lines (see Pat. No. 3,389,849), or break lines (see Pat. No. 3,371,848), or even for opposite edges of a tear strip.

Referring now to FIG. 1, a sheet 12 of thermoplastic material is supplied in a roll 14 which is supported in any convenient manner adjacent one end of a machine. In the embodiment illustrated, the sheet 12 is advanced longitudinally of the machine past a heating station 16, a forming station 17, and a cutting station 18. At the heating station 16 are heating heads 21 and 22 for heating the sheet 12 to the usual thermoforming temperature at which the sheet is rendered soft an flowable. The heating heads 21 and 22 may be of any type well-known in the art.

At the forming station 17, one or more lines of weakness 25 is formed in the sheet 12. In the embodiment of FIG. 1, there is shown upper and lower forming heads 27 and 28 which are movable toward and away from the sheet 12. Means, indicated by arrows 29, is provided for effectuating such movement and for clamping the sheet 12 between the forming heads. The forming heads will hereafter be described in greater detail.

In the embodiment shown in FIG. 1, the sheet 12, after being formed with its line or lines of weakness 25, is advanced to the cutting station 18. Cutting heads 32 and 33 are movable relative to each other by any convenient mechanism indicated by arrows 34. Cutting heads 32 and 33 are arranged to cut the sheet 12 into a useful shape as, for example, the shape of a blank B (see FIG. 2) which can be folded into a carton C (see FIG. 9). The machine may include an outlet conveyor 39 onto which the blanks B may be deposited.

At the forming station 17, the heated sheet of thermoplastic is cooled in selected areas, but not at the desired line of weakness 25, to shrink the sheet 12 away from said line 25 and reduce the thickness thereat. For this purpose, lower forming head 28 is provided with a groove at each desired location of the line of weakness. The grooves may be longitudinal grooves 41 or 42 or laterally extending grooves 43–48, as best seen in FIG. 2. One or more grooves may be utilized, and the grooves may be curved or straight. The lower forming head 28, or at least the grooved surface thereof, is preferably made of heat-conductive material, such as steel, and means is provided for cooling the grooved surface thereof to cool the sheet 12. As illustrated, the forming head 28 is provided with a plurality of passages 52 through which a cooling fluid may be passed. Conduits 53 are connected with the passages 52 and to a refrigerating apparatus 54 (see FIG. 1). A pump 56 is disposed in the conduit 53 for forcing the cooling fluid through the conduits 53 and the passages 52 to cool the head 28. A suitable cooling temperature is about 70 degrees Fahrenheit. As such, cooling can also be accomplished by air, if desired.

In the embodiment of FIGS. 1 and 3, the upper forming head 27 is constructed similar to forming head 28 and has grooves directly opposite, and collinear with, the grooves in head 28. Upper head 27 also has passages connected to conduit 53, as best seen in FIG. 1. The similar parts of upper head 27 are indicated by the same numerals used in the description for the lower head 28 followed by the postscript prime (') and further description is deemed unnecessary.

FIG. 4 is a large scale, partial sectional view of the apparatus illustrated in FIGS. 1–3. As shown, the heated sheet 12 is clamped between the heads 27 and 28. The grooves, such as grooves 43 and 43', are preferably of a width A which approximates the thickness A' of the sheet 12. By clamping the sheet 12, movement of the sheet is restrained except in the unclamped areas. In other words, the dimension between the grooves is maintained while the sheet is cooled. When the thermoplastic sheet shrinks as it is cooled, the shrinkage is concentrated in the areas overlying the groove 43. It is theorized that the plastic flows as in the direction of the illustrated arrows. The shrinkage causes the sheet to "neck" and reduce its thickness in the area overlying the grooves and thereby forms a line of weakness 25 at that point.

Figure 5:
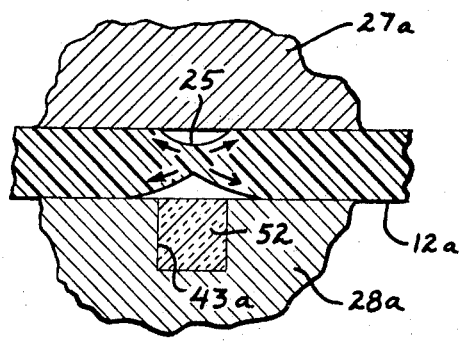
FIGS. 5–8 are views similar to FIG. 4 but illustrating different embodiments of the apparatus.

In the embodiment illustrated in FIG. 5, similar parts are followed by the postscript a. As shown, there is no groove in the upper head 27a. The groove 43a contains an insulated material 52 which prevents the sheet 12a from being cooled in the immediately adjacent area. A similar necking of the sheet 12a occurs.

Figure 6:
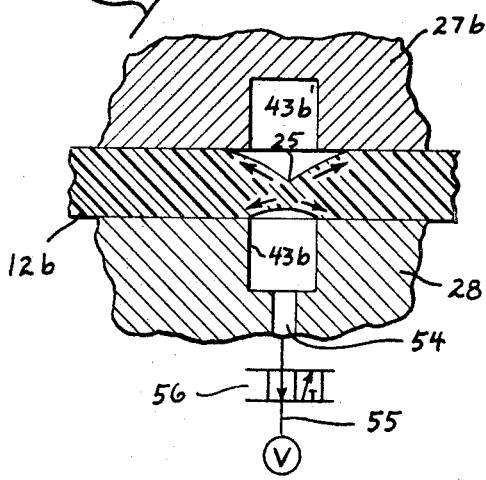

In the embodiment illustrated in FIG. 6, similar parts are followed by the postscript b. In this embodiment, a channel 54 communicates with grooves 43b. Channel 54 is connected to a source of vacuum V, as by a conduit 55 in which is interposed a two-way valve 56. The valve 56 is controlled so that the vacuum is pulled on the groove 43b simultaneously with cooling the heads 27b and 28b. The vacuum serves to hold the sheet 12b tightly against the head 28b. This restrains the sheet 12b against movement and also serves to limit the width of the line of weakness 25 on the side of the sheet adjacent the head 28b. Preferably, the width of the groove 43b is approximately equal to the thickness of sheet 12. If the groove is too wide, the vacuum will cause the plastic to be drawn into the groove in the usual vacuum forming manner. Such a result would be undesirable in the present invention, and the relative narrowness of the groove assures against plastic flow into the groove.

Figure 7:
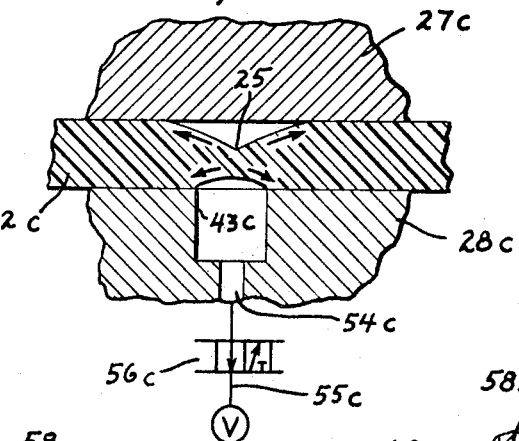

The embodiment of FIG. 7 is similar to that of FIG. 6 and similar parts are followed by the postscript c. In this embodiment, however, there are no grooves in the upper head 27c. It can be seen that a similar result it obtained.

Figure 8:
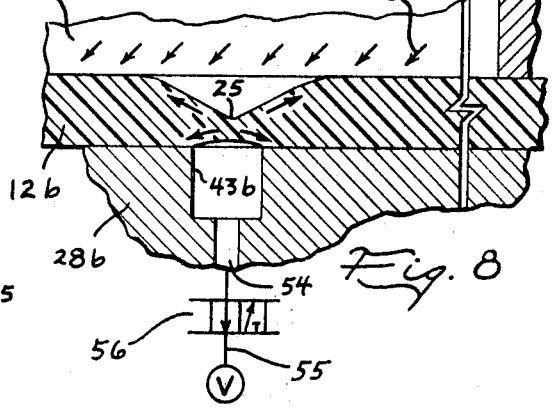

In the embodiment of FIG. 8, the lower head is identical to that shown in FIG. 6 and the similar parts are designated by the same numerals. In the embodiment, however, there is no flat upper head; rather, holding is accomplished by a peripheral frame 58 which clamps the sheet 12b against the lower head 28b. While the lower head 28b is cooled in the manner described above, the upper surface of the sheet 12b is cooled by directing air thereagainst, as indicated by arrows 60.

In each of the above embodiments, it can be seen that the sheet 12 is held against movement and, as it is cooled, the heated sheet reduces in thickness at the groove. In the drawings, it will be noted that the configuration of the various lines of weakness 25 varies somewhat. The drawings have been made from a visual observation of tests run on polyethylene. In polyethylene, the resulting line of weakness 25 appears to be from one-third to one-half of the original thickness of the sheet 12. Polyethylene, of course, has a high coefficient of thermal expansion. Reduction of thickness of thermoplastics which have a relatively low coefficient of thermal expansion, has also been accomplished by the method and apparatus of the present invention. For example, polystyrene, polypropylene, and polyvinyl chloride have been heated to a thermoforming temperature and then cooled in the manner of the present invention to form lines of weakness therein. In tests, a reduction in thickness at a preselected line was from about 14 to 20 percent. If additional reduction in thickness is desired, the method can be repeated on the sheet of thermoplastic.

Figure 9:
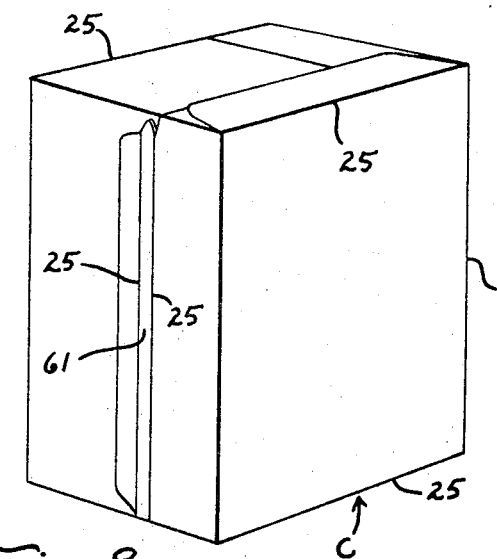
FIG. 9 is a completed carton constructed from the blank outlined in FIG. 2.

FIG. 9 shows a container C which may be formed from the blank B (see FIG. 2). The container is advantageously of the type which is used for packaging ice cream. The ordinary blank for such a container is usually made of cardboard which has score lines where it is to be folded. Additionally, a tear strip, such as at 61, is often provided. By utilizing the present invention, blank B is formed with lines of weakness 25 at the side fold lines and also at either side of the tear strip 61. The blank B is then folded at the fold lines and sealed in any convenient manner to form the container C.

It is now deemed obvious that there has been described a new and useful method for forming lines of weakness in thermoplastic. While a preferred method of the present invention has been described along with various embodiments, this has been done by way of illustration and not limitation, and is to be understood that various modifications will occur to a person skilled in the art.

The embodiments of the invention in which an exclusive property or privilege is claimed are defined as follows:

1. A method of forming a line of weakness in a sheet of thermoplastic which has been heated to render it flowable, comprising the steps of:
   (a) providing a heat-conductive material with a groove in its surface at the desired location of the line of weakness;
   (b) placing the heated sheet flat against the surface of the heat-conductive material;
   (c) holding the sheet on both sides of the groove to restrain movement of the sheet; and
   (d) cooling the heat-conductive material to cool and shrink the sheet faster at the area against the heat-conductive material than at the area overlying the groove to reduce the sheet thickness at the groove area and form a line of weakness thereat.

2. A method according to claim 1 wherein step (c) includes clamping the sheet against the heat-conductive material with a second heat-conductive material on the opposite side of the sheet, and wherein step (d) includes also cooling the second heat-conductive material.

3. A method of forming a line of weakness in a sheet of thermoplastic as set forth in claim 1 including the step of:
   (e) cooling the other side of the sheet simultaneously with cooling the heat-conductive material.

4. A method according to claim 1 including providing a second heat-conductive material with a surface facing the surface of the other heat-conductive material and with a groove in the surface similar to the other groove; clamping the heated sheet between the surfaces with the grooves directly opposite each other to hold the sheet and restrain movement thereof; and cooling the second heat-conductive material simultaneously with cooling the other heat-conductive material.

5. A method according to claim 1 wherein step (a) includes providing the heat-conductive material with a groove having a width approximating the thickness of the sheet; and including drawing a partial vacuum on the groove simultaneously with step (d) to help hold the sheet in position.

6. A method according to claim 5 including providing a second heat-conductive material with a surface facing the surface of the other heat-conductive material; clamping the heated sheet between the surfaces to hold the sheet and restrain movement thereof; and cooling the second heat-conductive material simultaneously with cooling the other heat-conductive material.

7. A method according to claim 6 including providing the second heat-conductive with a groove in its surface and having a width approximating the thickness of the sheet; and wherein the step of clamping the heated sheet between the surfaces includes clamping the heated sheet between the surfaces with the grooves generally collinear and overlying the desired line of weakness.

8. A method of forming a line of weakness in a sheet of thermoplastic having a preselected thickness and which has been related to render it soft and flowable, including the steps of:
(a) providing a heat-conductive material with two surfaces spaced apart by a heat-insulating material at the desired line of weakness and a distance approximating the thickness of the sheet of thermoplastic;
(b) placing the heated sheet against the surfaces;
(c) thereafter cooling the entire surface of the heated sulating material to resist movement of the sheet; and
(d) cooling the heat-conductive material to cool the sheet lying against the surfaces but not at the heat-insulating material to shrink the cooled areas and pull material from the still heated area thereby causing the sheet to neck adjacent the heat-insulating material and form a line of weakness thereat.

9. A method of forming a line of weakness of reduced cross-section in a sheet of thermoplastic material, including the steps of:
(a) heating the sheet of thermoplastic material to render it soft and flowable;
(b) holding the sheet on both sides of the desired line of weakness to restrain movement of the sheet;
(c) thereafter cooling the entire surface of the heated sheet except at the desired line of weakness while holding the sheet on both sides thereof; and
(d) shrinking the sheet away from the desired line while holding the sheet on both sides thereof to reduce the thickness thereat and form a line of weakness.

References Cited

UNITED STATES PATENTS

| | | | |
|---|---|---|---|
| 2,687,157 | 4/1954 | Cowan | 264—328X |
| 3,125,619 | 3/1964 | Miller | 264—327X |
| 3,256,564 | 6/1966 | Welshon | 264—327X |
| 3,342,915 | 9/1967 | Wanderer | 264—327X |
| 3,414,181 | 12/1968 | Sloan | 264—342X |
| 3,445,052 | 5/1969 | Lowallor | 229—3.5X |
| 3,489,265 | 1/1970 | Puents | 264—295X |

ROBERT F. WHITE, Primary Examiner

R. R. KUCIA, Assistant Examiner

U.S. Cl. X.R.

264—327, 342

PO-1050
(5/69)

UNITED STATES PATENT OFFICE
CERTIFICATE OF CORRECTION

Patent No. __3,577,484__   Dated __May 4, 1971__

Inventor(s) __William P. Jacobson__

It is certified that error appears in the above-identified patent and that said Letters Patent are hereby corrected as shown below:

Column 5, line 5, "related" should be -- heated --;

Column 5, lines 12 and 13, the phrase "(c) thereafter cooling the entire surface of the heated sulating" should be replaced by -- (c) holding the sheet on both sides of the heat-insulating--.

Signed and sealed this 7th day of September 1971.

(SEAL)
Attest:

EDWARD M. FLETHER, JR.
Attesting Officer

ROBERT GOTTSCHALK
Acting Commissioner of Patents